United States Patent
Kitamura et al.

[11] Patent Number: 5,810,342
[45] Date of Patent: Sep. 22, 1998

[54] TABLE APPARATUS WITH A FEEDBACK SCALE FOR A MACHINE TOOL

[75] Inventors: Akihiro Kitamura; Katsuji Taniguchi; Kousaku Kitamura; Shigeru Yamada; Takashi Saitou, all of Toyama-ken, Japan

[73] Assignee: Kitamura Machinery Co., Ltd., Japan

[21] Appl. No.: 720,725

[22] Filed: Oct. 1, 1996

[30] Foreign Application Priority Data

Oct. 13, 1995 [JP] Japan ................................. 7-290550

[51] Int. Cl.⁶ ..................................................... B23Q 3/18
[52] U.S. Cl. .......................... 269/60; 269/55; 269/289 R; 269/71; 269/73
[58] Field of Search .................. 269/60, 55, 56, 269/289 R, 71, 73, 329; 33/1 M, 706, 707, 708, 503, 568

[56] References Cited

U.S. PATENT DOCUMENTS

| | | | |
|---|---|---|---|
| 4,013,280 | 3/1977 | Chitaya et al. | 269/30 |
| 4,509,262 | 4/1985 | Nelle | 33/707 |
| 4,600,203 | 7/1986 | Miller et al. | 33/706 |
| 4,628,201 | 12/1986 | Schmitt | 33/707 |
| 5,099,583 | 3/1992 | Heinz et al. | 33/707 |
| 5,488,782 | 2/1996 | Ochiai | 33/706 |

FOREIGN PATENT DOCUMENTS

| | | |
|---|---|---|
| 293 268 | 11/1988 | European Pat. Off. . |
| 23 27 327 | 12/1973 | Germany . |
| 27 14 521 | 10/1978 | Germany . |
| 36 13 755 | 10/1986 | Germany . |
| 61 121855 | 6/1986 | Japan . |
| 62 079948 | 10/1987 | Japan . |
| 62 102949 | 10/1987 | Japan . |

*Primary Examiner*—James G. Smith
*Assistant Examiner*—Lee Wilson
*Attorney, Agent, or Firm*—Ronald P. Kananen

[57] ABSTRACT

A table apparatus for a machine tool for moving a table along a guide member by a driving mechanism, feeding of the table being controlled by a feedback scale in cooperation with the driving mechanism, the feedback scale having a scale portion and a detecting portion, with opposed vicinal surfaces for accepting the feedback scale defined on the guide member and the table, respectively, the scale portion of the feedback scale being mounted on one of the surfaces, while the detecting portion is mounted on the other.

11 Claims, 7 Drawing Sheets

TABLE APPARATUS WITH A FEEDBACK SCALE FOR A MACHINE TOOL

BACKGROUND OF THE INVENTION

The present invention relates to a table apparatus for a machine tool for moving a table along a guide member by a driving means, feed of the table being controlled by means of a feedback scale in cooperation with the driving means, the feedback scale having a scale member and a detecting member.

The table of a machine tool is controled by means of a feedback control system so that a feeding accuracy or a positioning accuracy of the table can be improved.

The feedback control is a closed loop system and is, in the machine tool, provided with a feedback scale.

The feedback scale is generally composed of an elongated scale member and a detecting member. The detecting member is also called a slider.

The feedback scale in prior art is mounted in a following manner.

Figure 5:
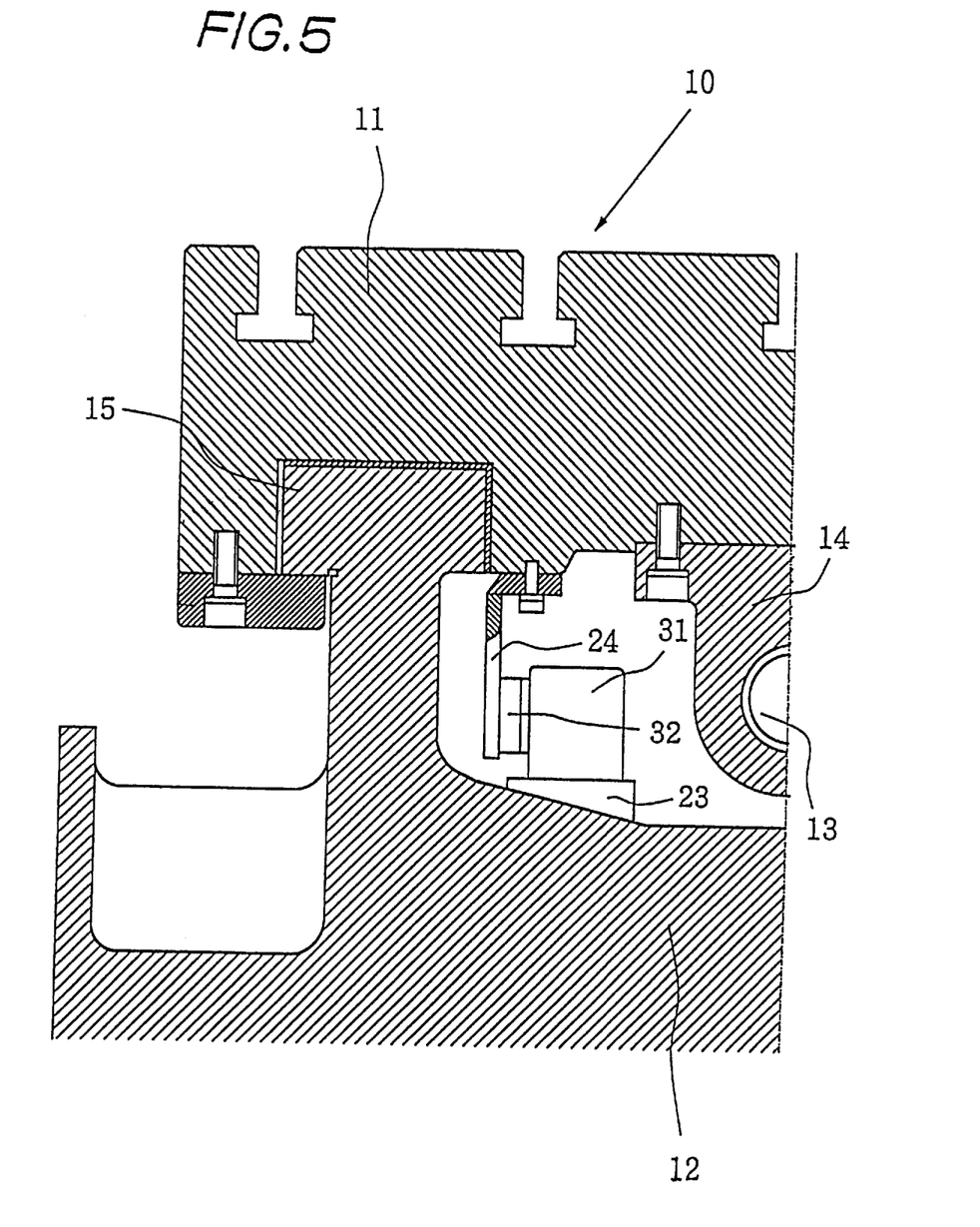
FIG. 5 is a sectional view showing a conventional table apparatus.

In prior art the feedback scale is arranged, for example, in a space between a table 11 and a saddle 12 as shown in FIG. 5. A scale member 31 is secured parallel with the guide member 15, for example, to the saddle 12. On the other hand, a detecting member 32 is secured on the side of the table 11 via a bracket 24. Of course, the scale portion 31 and the detecting portion 32 may be mounted in reverse.

Such setting has been ordinary because the scale member 31 has a large casing and requires a considerably big mounting space. It has been also intended to mount the feedback scale in just purchased form as effective as possible. It is to be noted that normally, the feedback scale is usually on sale with a casing.

The feedback scale in the early days mainly made use of electromagnetic induction or magnetism, with a resolving power thereof at 1 μm to a few μm.

Recently, a feedback scale of a photoelectric type incremental system having a high resolving power has become widely used. The feedback scale of this system has a high resolving power of 0.05 μm to 0.1 μm.

However, even if the feedback scale mounted on the table apparatus has a high resolving power of 0.05 μm to 0.1 μm and the feedback control is carried out, the position of the table is not always detected with high accuracy corresponding to said resolving power.

As a result of repeated zealous studies for clearing up the cause thereof, the inventors have found that a problem is involved in the way of mounting a feedback scale.

That is, the positioning accuracy is adversely affected by flexure, displacement and vibrations of the mounting bracket 24 (as well as the mounting member 23).

The accuracy is also deteriorated by the great amount of distance between the mounting position of the scale portion 31 and that of the detecting portion 32, that is, between the fixing position of the mounting member 23 and the bracket 24. "Deflection" or "hysteresis" resulting from movement of the table also delicately affects on the operation of the feedback scale. Even if the "deflection" itself is tiny, it is amplified by the bracket 24, and consequently, there occurs a significant detection error.

SUMMARY OF THE INVENTION

It is an object of the present invention to provide a table apparatus for a machine tool of high accuracy capable of positioning a table with accuracy corresponding to a resolving power peculiar to a feedback scale.

The present invention provides a table apparatus for a machine tool for moving a table along a guide member by a driving means, feed of the table being controled by means of a feedback scale in cooperation with the driving means, the feedback scale having a scale portion and a detecting portion, wherein opposed vicinal surfaces for accepting the feedback scale are defined on the guide member and the table, respectively, the scale portion of the feedback scale being mounted on one of the surfaces, while the detecting portion being mounted on the other.

According to the table apparatus for a machine tool of the present invention, the scale portion and the detecting portion of the feedback scale are directly mounted on opposed vicinal surfaces of the guide member and the table, respectively, so that a mounting bracket is not necessary, thereby an error caused by flexure or displacement thereof can be removed. Accordingly, it is possible to realize the feedback control with high accuracy.

Further, the casing of the scale portion which has been indispensable is not necessary. Accordingly, it is possible to reduce the cost.

Further, since the temperature of the scale portion 21 is substantially the same as that of the sliding portion, the positioning accuracy can be improved.

At least one of said opposed surfaces can be provided with recessed setting portion, to which is mounted the scale portion or the detecting portion of the feedback scale.

The guide member has, for example, a cross-section. of a T-shape or an L-shape as a whole.

The table can be an X-Y table.

The feedback scale can be, an electromagnetic induction type, a magnetism type, a photoelectric type incremental system.

The driving means is preferably formed by a nut fixed on the table and a ball screw feed thread rotatably supported so as to mate the nut.

But, even in the case where a conventional trapezoidal screw thread is used, it is possible to carry out a feeding or a positioning with high accuracy to some extent.

DESCRIPTION OF THE PREFERRED EMBODIMENTS

A preferred embodiment of the present invention will be described hereinafter with reference to the drawings.

Figure 1:
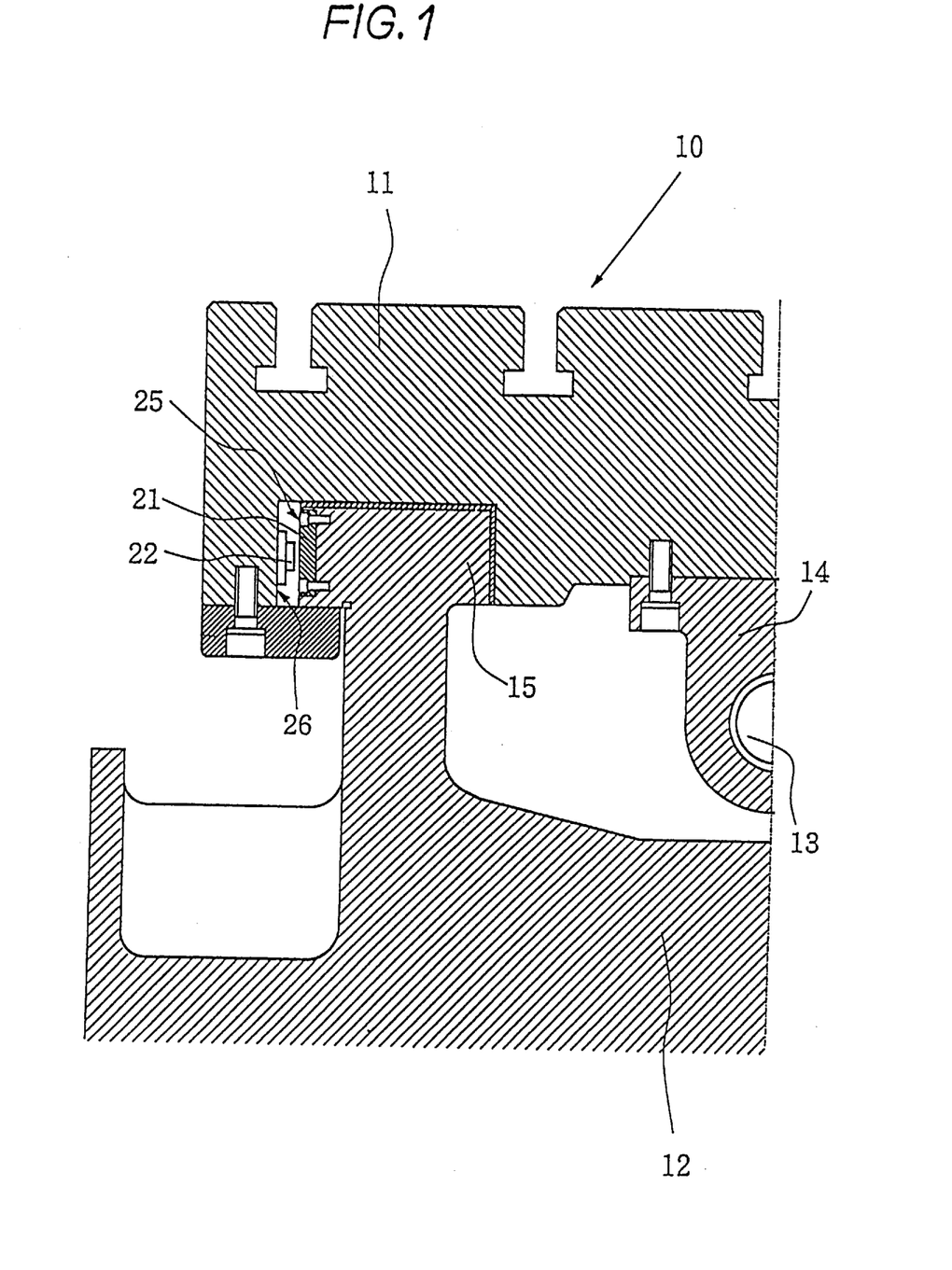
FIG. 1 is a sectional view showing an embodiment of a table apparatus for a machine tool according to the present invention.
Figure 2:
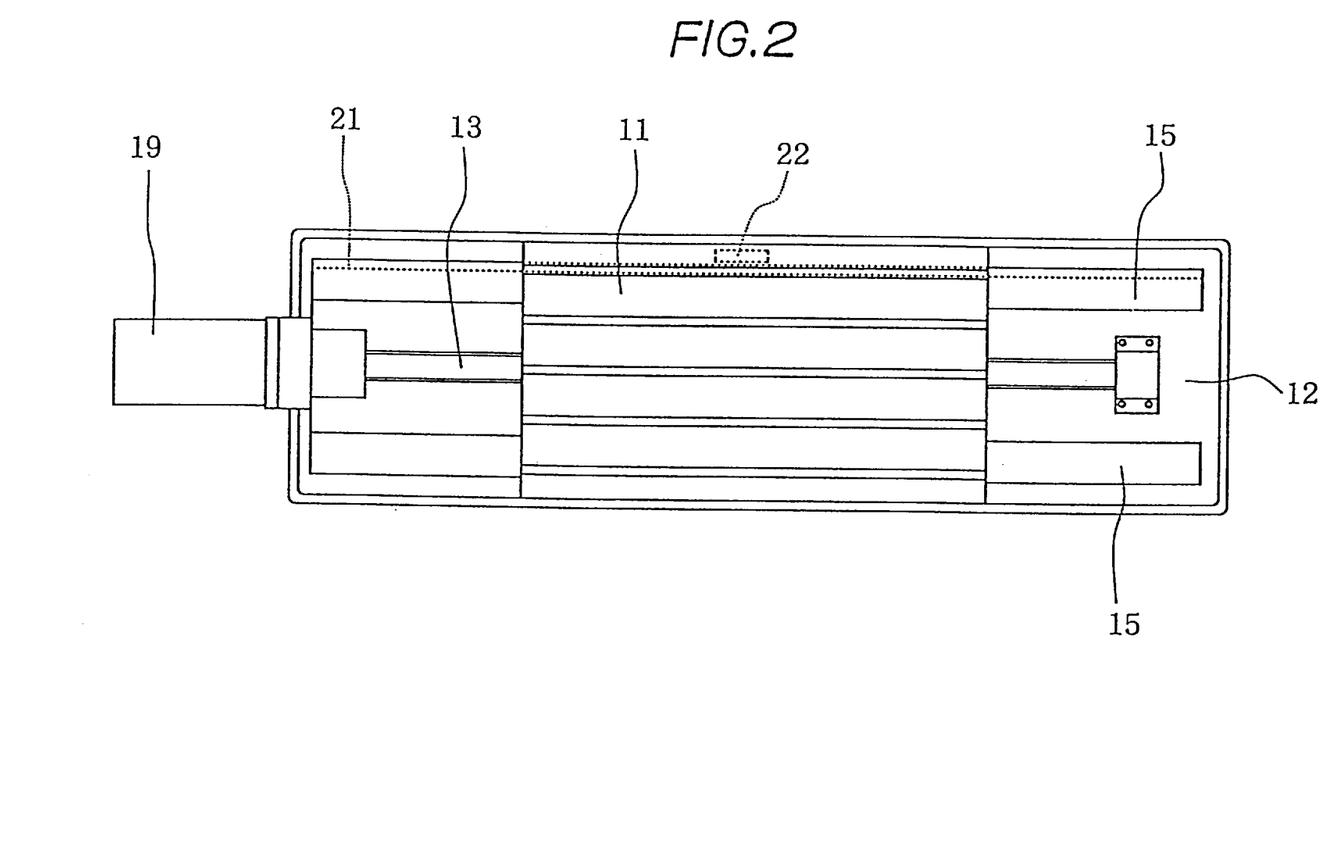
FIG. 2 is a top view showing the table apparatus for a machine tool shown in FIG. 1.

FIGS. 1 and 2 are a sectional view and a top view, respectively, of a table apparatus for a machine tool according to the present invention.

The present invention is featured by the way of mounting a feedback scale, consequently for other parts, the corresponding constructions of a conventional table apparatus of a machine tool can be employed without modification. Accordingly, the former will be mainly described in the following.

A table apparatus 10 for a machine tool according to the present invention can be applied to NC machine tools (not shown) such as a knee type milling machine, a bed type milling machine, a lathe, a grinding machine, an electric discharge machine, a horizontal boring machine and the like, conventionally used.

The table apparatus 10 has a saddle 12.

Two rail-like parallel guide members 15 are arranged in a longitudinal direction on the upper surface of the saddle 12. The guide member 15 has a cross-section of a T-shape as a whole.

A feed screw thread 13 is supported rotatably about the axis between and parallel with the two guide members 15. A servo motor 19 is connected to one end of the feed screw thread 13.

A table 11 is slidably arranged on the guide members 15. The table 11 is provided with a recess formed on its lower surface, with which are engaged the guide members 15. A nut 14 is secured at a central portion on the lower surface of the table 11.

The nut 14 is in engagement with the feed screw thread 13 so that when the feed screw thread 13 rotates, the nut 14 is slidably moved along it together with the table 11. The feed screw thread 13 may be a ball screw thread with high accuracy or a conventional trapezoidal screw thread.

In the table apparatus according to the present invention, the feedback control can be carried out with high accuracy, and even in the case of the normal trapezoidal screw thread an accuracy to some extent can be obtained.

In the embodiment shown in FIG. 1, the upper surface and right surface of the T-shape section of the guide member 15 define sliding surfaces. On the other hand, the upper surface and right surface of the recess of the table 11 defines sliding surfaces corresponding thereto.

The left surface of the T-shape section of the guide member 15 is close to the left surface of the depression of the table 11 but a small clearance is defined therebetween.

The guide member 15 is formed on its left surface of the T-shape section with a mounting recess, in which is secured a scale portion 21 of the feedback scale by means of a bolt. On the other hand, on the left surface of the recess of the table 11 is secured a detecting portion 22 of the feedback scale so as to be closely opposed to the scale portion 21.

The scale portion 21 and the detecting portion 22 of the feedback scale are directly mounted on opposed vicinity surfaces of the guide members 15 and the table 11, respectively. Therefore the mounting bracket 24 shown in FIG. 5 is not necessary and an error caused by flexure or displacement thereof can be removed.

A casing of the scale portion 21 which has been indispensable in prior art is not necessary in this invention. The casing of the scale portion 21 is omitted so that a sectional area required for mounting can be reduced, thereby the scale portion 21 can be embedded on the guide member 15.

Further, a temperature of the scale portion 21 is substantially the same as that of the sliding portion, therefore the positional detection accuracy can be improved.

It is to be noted of course that the scale portion 21 can be mounted on the table 11 and the detecting portion 22 can be mounted on the guide member 15.

Figure 4:
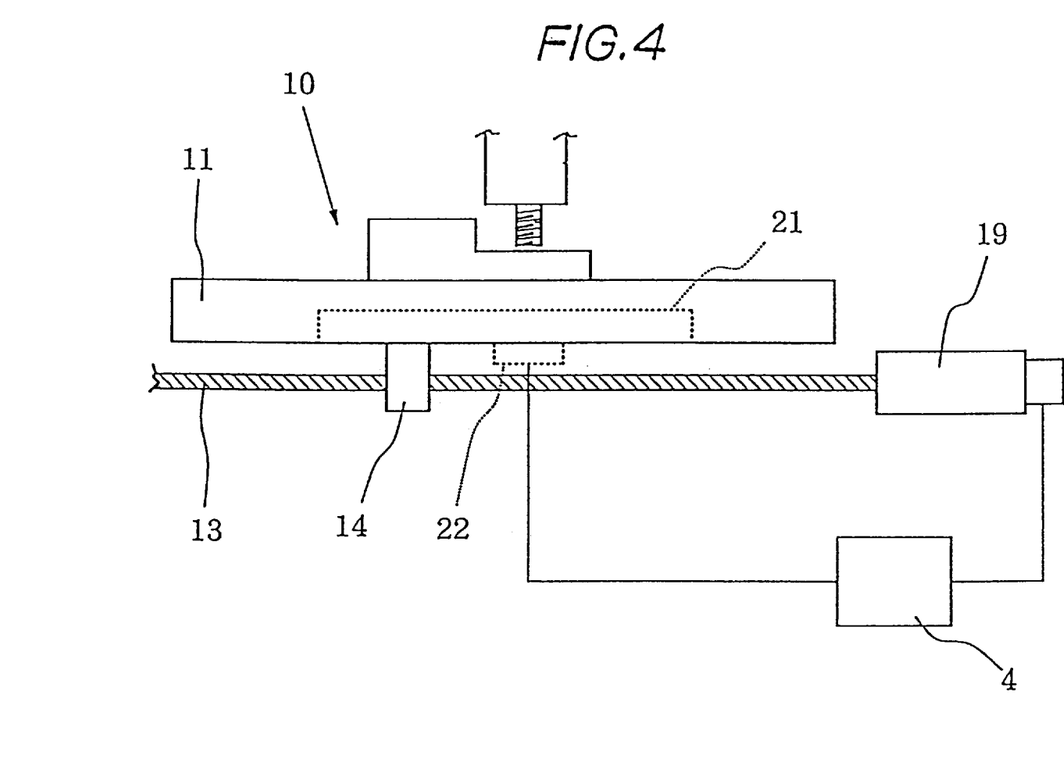
FIG. 4 is an explanatory view showing a flow of a signal of the table apparatus for a machine tool shown in FIG. 1.

FIG. 4 illustrates a flow of signals of the table apparatus 10.

The detecting portion 22 of the feedback scale is connected to an NC control apparatus 4 of the machine tool. The servo motor 19 is also connected to the NC control apparatus 4.

The feed of the table 11 is feedback-controlled on the basis of a value detected by the feedback scale.

An automatic tool exchanger, a cooling water supply apparatus, etc. not shown are also controlled by the NC control apparatus 4 as is known.

Figure 7:
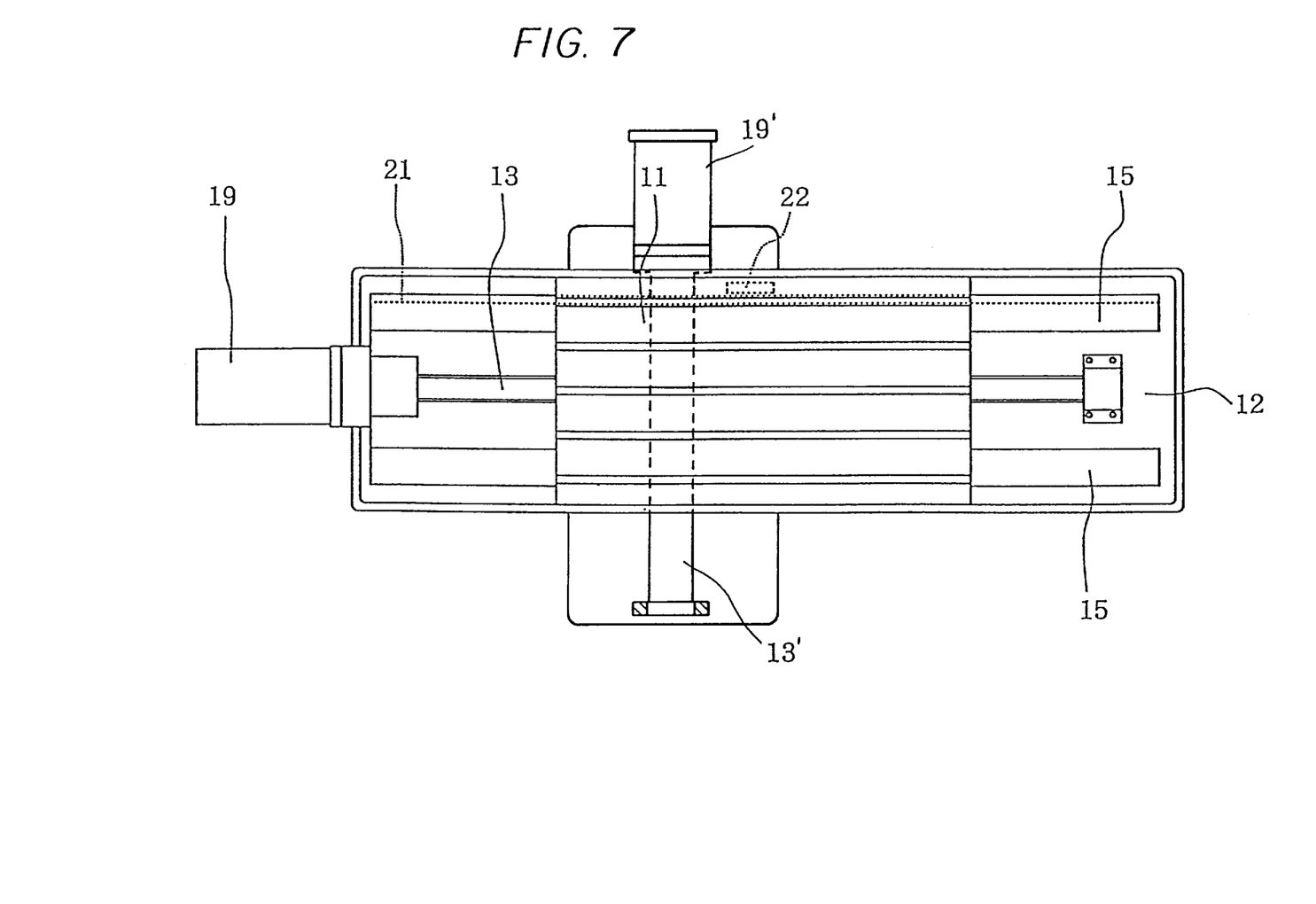
FIG. 7 is a top view showing an X-Y table apparatus for a machine tool.

The table 11 may alternatively be an X-Y table. The saddle 12 can be also slidably mounted on the bed (not shown). A feedback scale not shown in such case would be provided between the saddle 12 and the bed in the same or a similar manner to the above description embodiment. In such case, it would be possible to carry out the accurate feedbackl control in both X and Y directions. FIG. 7 shows a top view of an X-Y table apparatus, with a second servo motor 19' rotating a second feed screw thread.

Figure 3:
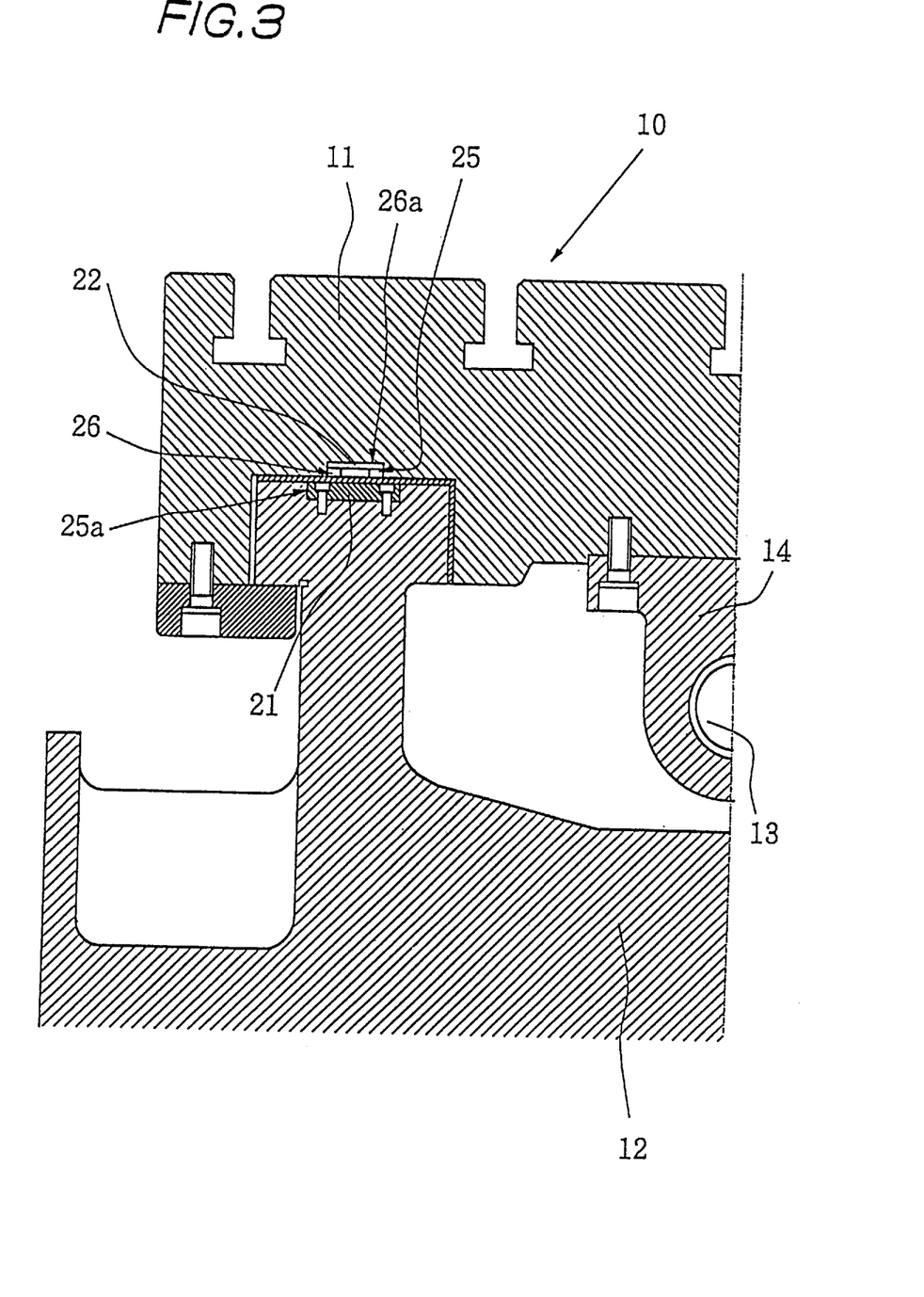
FIG. 3 is a view corresponding to FIG. 1 of a further embodiment.

A further embodiment of the present invention will be described with reference to FIG. 3.

In this embodiment, a mounting recess 25a is formed on an upper sliding surface 25 of a guide member of a T-shaped section , in which is embedded a scale portion 21. A mounting recess 26a is also formed on a sliding surface 26 of the table which slides along said surface, in which is embedded a detecting portion 22.

Of course, it is also possible that the scale portion 21 is mounted on the table 11, and the detecting portion 22 is mounted on the guide member 15.

Also in this embodiment, the similar effect to the previously mentioned embodiment can be obtained.

The present invention is not limited to the aforementioned embodiments.

For example, the opposed surfaces close to each other in which the scale portion and the detecting portion are mounted are not necessarily coplanar but may be curved or bent. In that case, it is important that the scale portion and the detecting portion are opposed each other in a proper positional relationship.

Figure 6:
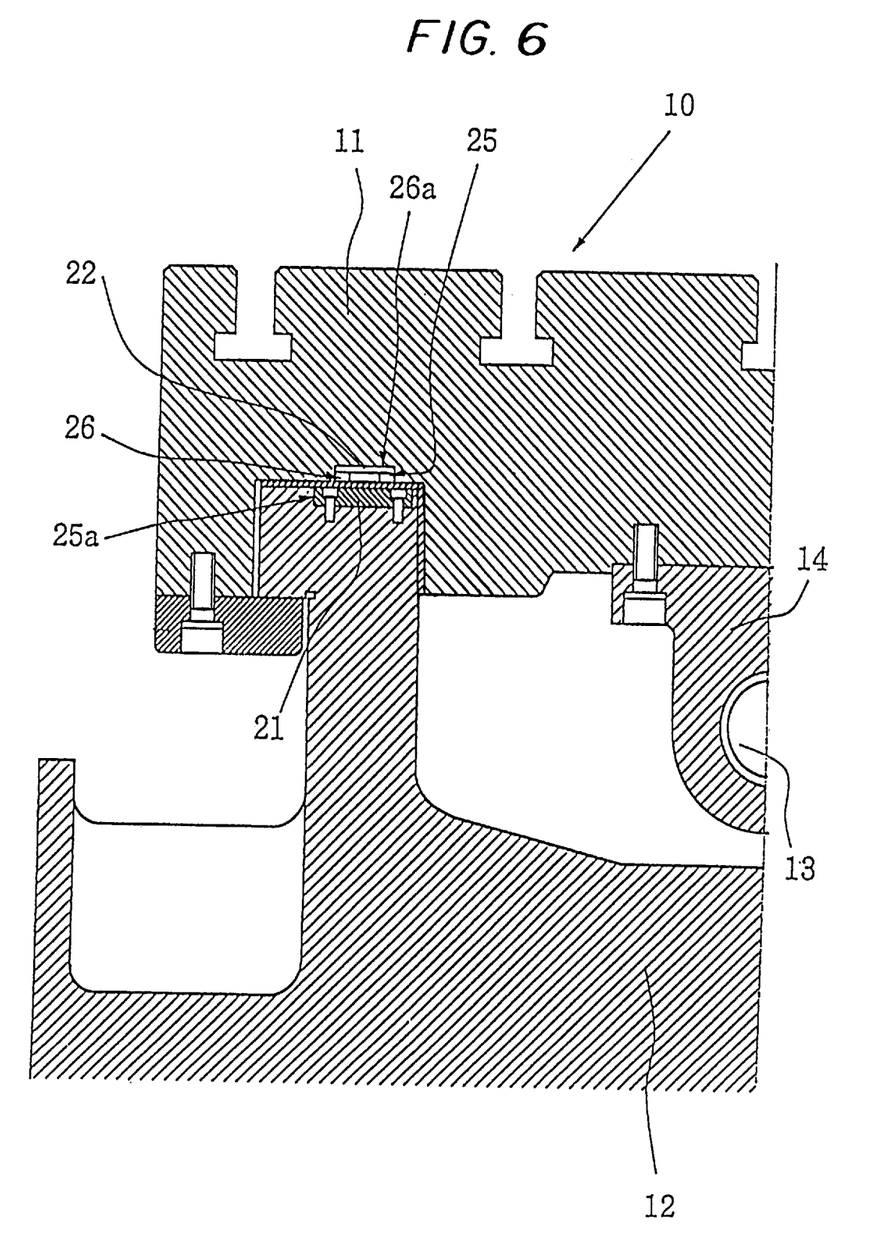
FIG. 6 is a sectional view showing a further embodiment of a table apparatus or a machine tool.

Further, a cross-sectional shape of the guide member may be of an L-shape or other shapes as shown in FIG. 6.

Furthermore, the table apparatus according to the present invention can be also applied to not only the feedback control of a parallel movement but also the feedback control of a rotational movement.

What is claimed is:

1. A table apparatus for a machine tool for moving a table (11) along a guide member (15) by a driving means, feed of the table (11) being controlled by means of a feedback scale in cooperation with the driving means, the feedback scale having a scale portion (21) and a detecting portion (22), wherein first and second opposed vicinal surfaces (25, 26) for accepting the feedback scale are defined on the guide member (15) and the table (11), respectively, the scale portion (21) of the feedback scale being directly mounted on one of said first and second surfaces (25, 26), while the detecting portion (22) is directly mounted on the other of said first and second surfaces (26 or 25).

2. The table apparatus for a machine tool according to claim 1, wherein at least one of said first and second surfaces (25, 26) is provided with a recessed setting portion (25a, 26a), in which is mounted the scale portion (21) or the detecting portion (22) of the feedback scale.

3. The table apparatus of claim 2, wherein both of said scale portion and said detecting portion have outer surfaces, and are embedded within said first and second surfaces, respectively, so that said outer surfaces of said scale and detecting portions are flush with said first and second surfaces.

4. The table apparatus for a machine tool according to claim 1 wherein the guide member (15) has a cross-section of a T-shape or an L-shape as a whole.

5. The table apparatus for a machine tool according to claim 1, wherein the table (11) is an X-Y table.

6. The table apparatus for a machine tool according to claim 1, wherein the driving means includes a nut (14) fixed on the table (11) and a ball screw feed thread (13) rotatably supported and mating with the nut (14).

7. The table apparatus for a machine tool according to claim 1, wherein the feedback scale is an electromagnetic induction type.

8. The table apparatus for a machine tool according to claim 1, wherein the feedback scale is a magnetism type.

9. The table apparatus for a machine tool according to claim 1, wherein the feedback scale is a photoelectric type.

10. The table apparatus for a machine tool according to claim 1, wherein opposed vicinal surfaces (25, 26) for accepting the feedback scale are defined on the guide member (15) and the table (11), respectively, the scale portion (21) of the feedback scale being mounted on one of the surfaces (25 or 26), while the detecting portion (22) being mounted on the other (26 or 25), wherein at least one of said surfaces (25, 26) is provided with a recessed setting portion (25a, 26a), in which is mounted the scale portion (21) or the detecting portion (22) of the feedback scale, wherein the guide member (15) has a cross-section of a T-shape or an L-shape as a whole, wherein the table (11) is an X-Y table, wherein the driving means includes a nut (14) fixed on the table (11) and a ball screw feed thread (13) rotatably supported and mating with the nut (14).

11. The table apparatus of claim 1, wherein at least one of said scale portion and said detecting portion is embedded within either of said first or second surfaces.

* * * * *